US 7,592,945 B2

(12) United States Patent
Colburn et al.

(10) Patent No.: US 7,592,945 B2
(45) Date of Patent: Sep. 22, 2009

(54) METHOD OF ESTIMATING TARGET ELEVATION UTILIZING RADAR DATA FUSION

(75) Inventors: Joseph S. Colburn, Malibu, CA (US); Osman D. Altan, Northville, MI (US); Kevin Geary, Los Angeles, CA (US); Hui-Pin Hsu, Northridge, CA (US)

(73) Assignee: GM Global Technology Operations, Inc., Detroit, MI (US)

( * ) Notice: Subject to any disclaimer, the term of this patent is extended or adjusted under 35 U.S.C. 154(b) by 135 days.

(21) Appl. No.: 11/769,017

(22) Filed: Jun. 27, 2007

(65) Prior Publication Data

US 2009/0002222 A1    Jan. 1, 2009

(51) Int. Cl.
*G01S 13/00* (2006.01)

(52) U.S. Cl. .............. 342/70; 342/59; 342/60; 342/118; 342/123

(58) Field of Classification Search ............ 342/70
See application file for complete search history.

(56) References Cited

U.S. PATENT DOCUMENTS

| 6,429,804 | B1 * | 8/2002 | Kishida et al. ........... 342/70 |
| 7,100,726 | B2 * | 9/2006 | Kim .................... 180/169 |
| 2002/0150304 | A1 * | 10/2002 | Ockman ................ 382/260 |
| 2002/0191198 | A1 * | 12/2002 | Dunne et al. ........... 356/635 |
| 2004/0119633 | A1 * | 6/2004 | Oswald et al. ........... 342/70 |
| 2006/0027404 | A1 * | 2/2006 | Foxlin ................ 178/18.06 |
| 2006/0126927 | A1 * | 6/2006 | Vesely et al. ........... 382/154 |
| 2007/0043491 | A1 * | 2/2007 | Goerick et al. ........... 701/41 |
| 2008/0111733 | A1 * | 5/2008 | Spyropulos et al. ....... 342/189 |

* cited by examiner

*Primary Examiner*—Thomas H Tarcza
*Assistant Examiner*—Timothy A Brainard (57) ABSTRACT

A collision avoidance system for reducing false alerts by estimating the elevation of a target, includes short and long range single-dimensional scanning radar sensors having differing ranges and beam angles of inclination, and a digital fusion processor, and preferably includes a locator device, an inclinometer, and a memory storage device cooperatively configured to further perform trend analysis, and target tracking.

10 Claims, 6 Drawing Sheets

Track 1 (32 deg 25.500 min); $\alpha = 16°$ ; $\beta = 3°$ ; $t(c) = .02$

| | t(x) | PSRR | Height | PLRR | Height | Range | $f\binom{PSRR}{PLRR}$ | Azimuth | $\gamma$ | Y |
|---|---|---|---|---|---|---|---|---|---|---|
| 1 | 12:58 | — | — | .21 | 3.8 m | 132 m | 0 | 29'43"W | .010 | 0 |
| 1.5 | 13.03 | .14 | 4.5 m | .04 | 1.2 m | 30 m | 3.5 | 27'22"W | .015 | 1 |
| 2 | 13.04 | .33 | 3.3 m | — | — | 25 m | > 10 | 27'21"W | .017 | 2 |

METHOD OF ESTIMATING TARGET ELEVATION UTILIZING RADAR DATA FUSION

BACKGROUND OF THE INVENTION

1. Technical Field

The present invention relates to collision avoidance and target identification systems and methods.

2. Discussion of Prior Art

Conventional collision avoidance and target identification systems typically employ the usage of radar technology, as radar continues to present a more facilely implementable and efficiently operable medium of detection. Both short-range radar (SRR) and long-range radar (LRR) enjoy wide application in many industries, such as automotive safety systems, and are often used in over-lapping configuration. In these systems, one or more laterally scanning sensors are oriented and configured to perform a single-dimensional scan of the surrounding environment, so as to detect surficial objects within an operable range. In some configurations, where an object is detected, a trend in the radar return signal strength over a period is assessed to determine whether the target (i.e., detected object) is approaching or departing.

A prevailing concern in conventional radar systems is that they typically generate a significant number of false alerts (i.e. warnings of imminent collisions with objects that are not true threats). This concern is especially perpetuated by their inability to discriminate between objects present at different elevations. For example, in automotive safety applications, false alerts of in-path obstruction are often caused by hyper-elevated objects, such as overhead signs and overpasses, because both SRR and LRR sensors are not capable of determining the elevation of a target. Since signs and overpasses are typically present in great numbers along an interstate highway or other thoroughfare path, the number of false-alerts generated thereby may produce a significant nuisance to the driver. Similarly, many hypo-elevated or low-lying features, such as potholes and railroad tracks, have also generated false alerts.

Where three-dimensional information, such as the height, amplitude or elevation of targets is desired, collision avoidance systems have incorporated stereo vision, two-dimensional scanning Lidar, two-dimensional scanning Radar, or Radar with azimuth and elevation resolution using monopulse, multibeam, phased array or digital beam technology. All of these options, however, present high costs of implementation and operation, and some have performance limitations based on environment.

Thus, there remains a need in the art for a collision avoidance and target identification system that is able to efficiently estimate the elevation of a target, so as to reduce the number of false alerts generated by hyper and hypo-elevated objects.

SUMMARY OF THE INVENTION

Responsive to these and other concerns, the present invention presents an improved collision avoidance and target identification system that utilizes single-dimensional scanning radar technology and data fusion to estimate the elevation dimension and/or pattern of a target. The present invention is adapted for use with a variety of safety systems that require object detection capabilities, such as Automatic Braking, Full Speed Range Adaptive Cruise Control, Intelligent Panic Brake Assist, Pre-Crash, etc. Of particular benefit to the public, the invention is useful for reducing the number of false alerts caused by hyper-elevated objects such as overpasses, and hypo-elevated appurtenances such as railroad tracks.

A first aspect of the invention concerns a system for estimating the elevation of at least one target utilizing conventional single-dimensional radar technology. The system includes a first radar sensor having a first operable range and first beam angle of inclination, and configured to generate a first return signal based on the relative distance between the first sensor and each of said at least one target, the operable range, and the angle of inclination. A second radar sensor having a second operable range different from the first range and second beam angle of inclination different from the first angle of inclination is also included. The second sensor is configured to generate a second return signal based on the relative distance between the second sensor and each of said at least one target, the operable range, and the angle of inclination. Lastly, a digital fusion processor communicatively coupled to the first and second sensors and configured to determine a relative signal value based on the first and second return signals is provided to autonomously execute the intended function of the invention. The processor is further configured to estimate the elevation of said each of said at least one target based on the relative signal value.

A second aspect of the invention concerns a method of estimating the elevation of at least one target utilizing single-dimensional scanning radar technology and data fusion. First, a short range radar beam having a first angle of inclination and a first range is directed from a first height of operation and towards a target. A longer range radar beam having a second angle of inclination less than the first angle of inclination and a second range longer than the first range is directed from a second height of operation and towards the target. Return signals from the short and longer range beams are received, when the target is within both the first and second ranges. Target elevation information based on the beam angles of inclination are fused to determine a relative return signal value or combined pattern. Finally, the relative return signal value or combined pattern is compared with a plurality of predetermined target elevation identification categories, so as to determine a matching category.

The preferred generative output is the issuance of a warning or automatic response, when a true in-path target is determined. Other aspects of the present invention include the addition of a memory storage device for enabling object tracking and trend analysis, an inclinometer communicatively coupled to the processor and configured to determine the angles of operation, and the processor being further configured to determine an aggregate relative return signal value.

It will be understood and appreciated that the present invention may provide a number of advantages over the prior art, including, for example, taking advantage of perfuse market penetration of single-dimensional scanning radar sensors in existing active safety systems, and providing a more efficient, reliable, and accurate determination of true in-path objects. More particularly, it reduces false positives, improves the performance of active safety systems and extends the envelope of operation. Finally, it yields robust and accurate estimates of target elevation characteristics, without requiring additional hardware. Other aspects and advantages of the present invention will be apparent from the following detailed description of the preferred embodiment(s) and the accompanying drawing figures.

BRIEF DESCRIPTION OF DRAWINGS

Preferred embodiments of the invention are described in detail below with reference to the attached drawing figures, wherein.

DETAILED DESCRIPTION OF THE INVENTION

As shown in the illustrated embodiment, the present invention concerns a collision avoidance system 10 adapted for use with host vehicles 12, such as but not limited to automobiles, boats and aircrafts, and by an operator 14 (FIGS. 1 through 4). In general, the system 10 fuses the return signals of at least two radar sensors 16,18 to estimate elevation information for at least one target (or detected object) 20, such as the overpass shown in the illustrated embodiment.

Figure 4:
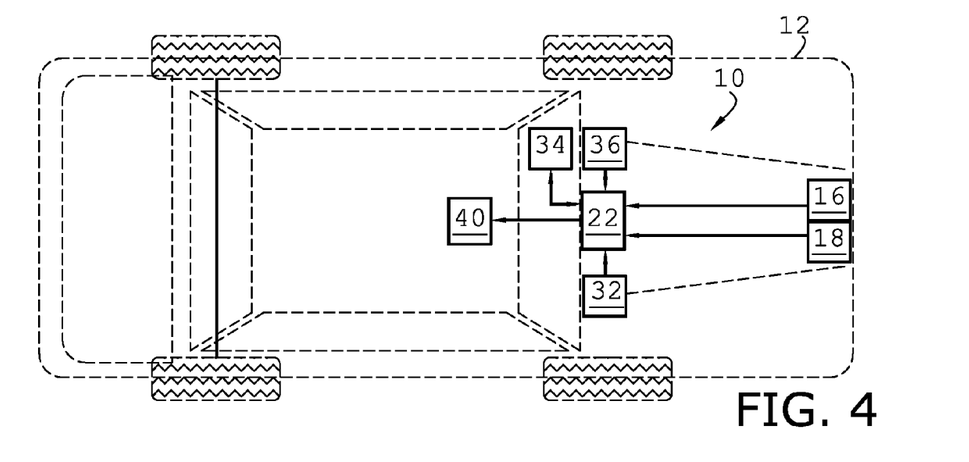
FIG. 4 is a plan view of a host vehicle in accordance with a first preferred embodiment of the present invention, diagrammatically presenting first and second radar sensors, a locator device, a memory storage device, a digital fusion processor (electronic control unit), an inclinometer, and a monitor.

As shown in FIG. 4, a digital fusion processor (DFP) 22 consists of an electronic control unit programmably equipped to perform the various algorithms and functions described herein, or more preferably, a plurality of communicatively coupled (i.e., connected by hard-wire or by a wireless communication sub-system) control units configured to perform parallel computations as part of a neural network. Alternatively, certain sub-routines may be performed by intermediate control units prior to delivery to the DFP 22 in series. For example, each of the sensors 16,18 may further include an electronic control unit configured to construct the return signal pattern, prior to fusion at the DFP 22; or a separate threat assessment controller (not shown) may be communicatively coupled to and configured to perform threat assessment after receiving fused data from the DFP 22. It is, therefore, appreciated that the host vehicle 12 includes sufficient electrical, software processing and communication bus sub-system capabilities necessary to effect the intended benefits of the system 10. Said structural configurations are readily determinable by one of ordinary skill in the art, and therefore, will not be further discussed.

A. Structural Configuration and Function

As illustrated and described, the system 10 includes two radar sensors 16,18, each configured to laterally scan a forward environment in a single-degree of freedom (FIG. 4); however, it is certainly within the ambit of the present invention to utilize an array of sensors oriented in multiple forward projections, so as to provide a more robust frontal detection system. It is also within the ambit of the invention, for a single sensor capable of transmitting a plurality of differing beams as further described herein to be utilized. Preferably, the system 10 includes at least one short range radar (SRR) sensor 16, and at least one longer range radar (LRR) sensor 18, wherein "short range," may be defined, for example, as having a general operating range of 0 to 30 m, and "longer range" may be defined as having an operable range of 0 to 250 m.

The sensors 16,18 are positioned at a preferred above-ground height (e.g., 45 cm) and oriented to desired angles of operation, γ, so as to facilitate maximum coverage. To simplify data processing, both the SRR and LRR sensors preferably present normally horizontal angles of operation on flat surfaces (FIG. 3); however, it is appreciated that the sensors 16,18 need not be congruently oriented. For example, it is certainly within the ambit of the invention to have differing angles of operation, wherein one of the sensors 16,18 is tilted with respect to the other. In this configuration, it is further appreciated that the sensors 16,18 may have congruent ranges; that is to say, they may both present SRR or LRR sensors. Finally, the preferred sensors 16,18, may be adjustably mounted to the vehicle 12, so as to achieve a plurality of angles of operation or above-ground heights.

Figure 1:
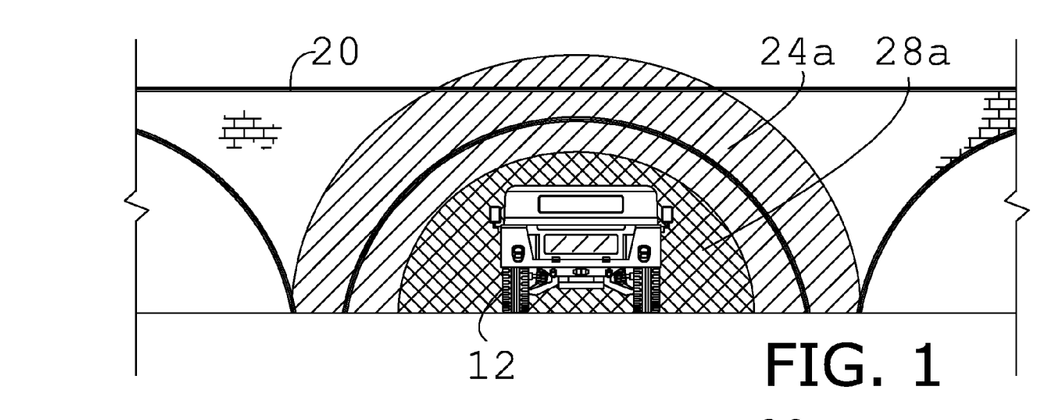
FIG. 1 is a rear elevation view of a vehicle detecting an approaching object (overpass), particularly illustrating the overlapping coverage areas of an SRR and an LRR sensor.
Figure 2:
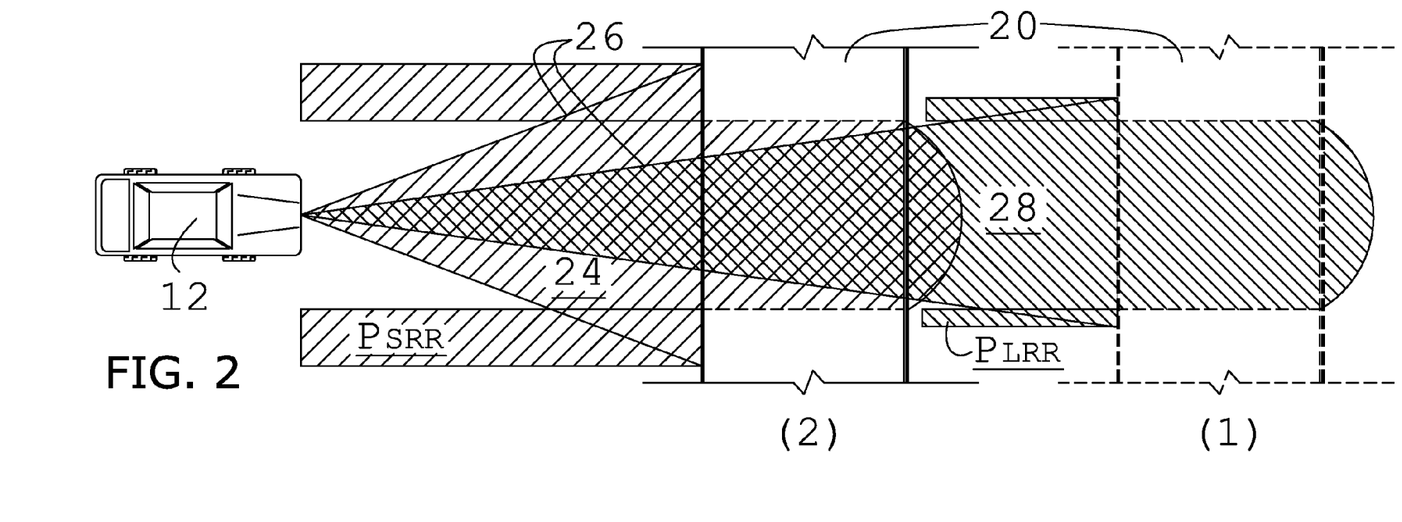
FIG. 2 is a plan view of the vehicle and object shown in FIG. 1, further illustrating the object being detected by the LRR sensor at (1) and later by the SRR sensor at (2)
Figure 3:
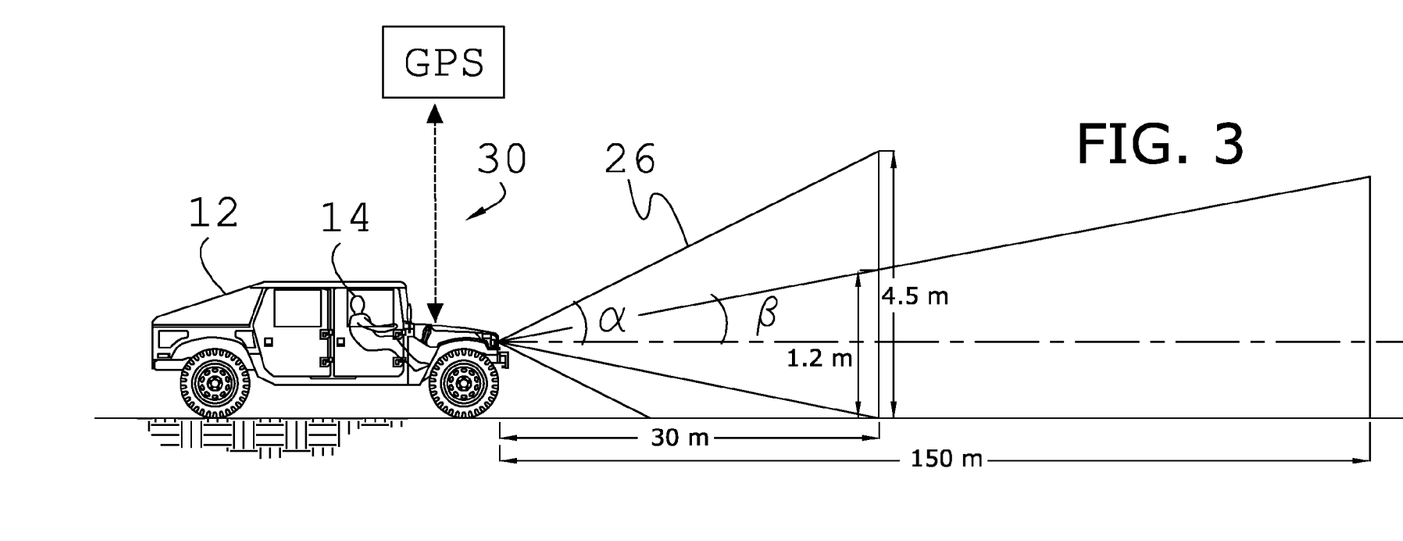
FIG. 3 is an elevation view of the host vehicle, particularly illustrating the operation of a GPS locator, the SRR beam coverage, and the LRR beam coverage.

As best shown in FIG. 3, the SRR sensor 16 produces a first beam 24 having a first angle of inclination, α, equal to one-half the angle formed by the linearly diverging outer beam boundary 26. For example, α may be within the range 10 to 30 degrees, for typical clearance heights. The coverage areas 24a,28a indicated in FIGS. 1 and 3, are not as abrupt as shown, however, but generally indicate where the sensitivity of the sensors 16,18 drop by 3 dB. In a preferred embodiment, a Kalman filter may be used to model and estimate the variance in coverage area caused by the sensitivity of the sensors 16,18, so as to more accurately determine the angle of inclination and therefore, the target elevation data. When the target 20 is within range, the SRR sensor 16 is configured to generate a first return signal ($P_{SRR}$) based on the relative distance between the sensor 16 and target 20, and α.

Similarly, the LRR sensor 18 produces a second more narrow beam 28 having a second angle of inclination, β, that is substantially less than α (FIG. 3). For example, β may be within the range of 1 to 5 degrees. When the target 20 is within its range, the LRR sensor 18 is configured to generate a second return signal ($P_{LRR}$) based on the relative distance between the sensor 18 and target 20, and β.

Figure 7:
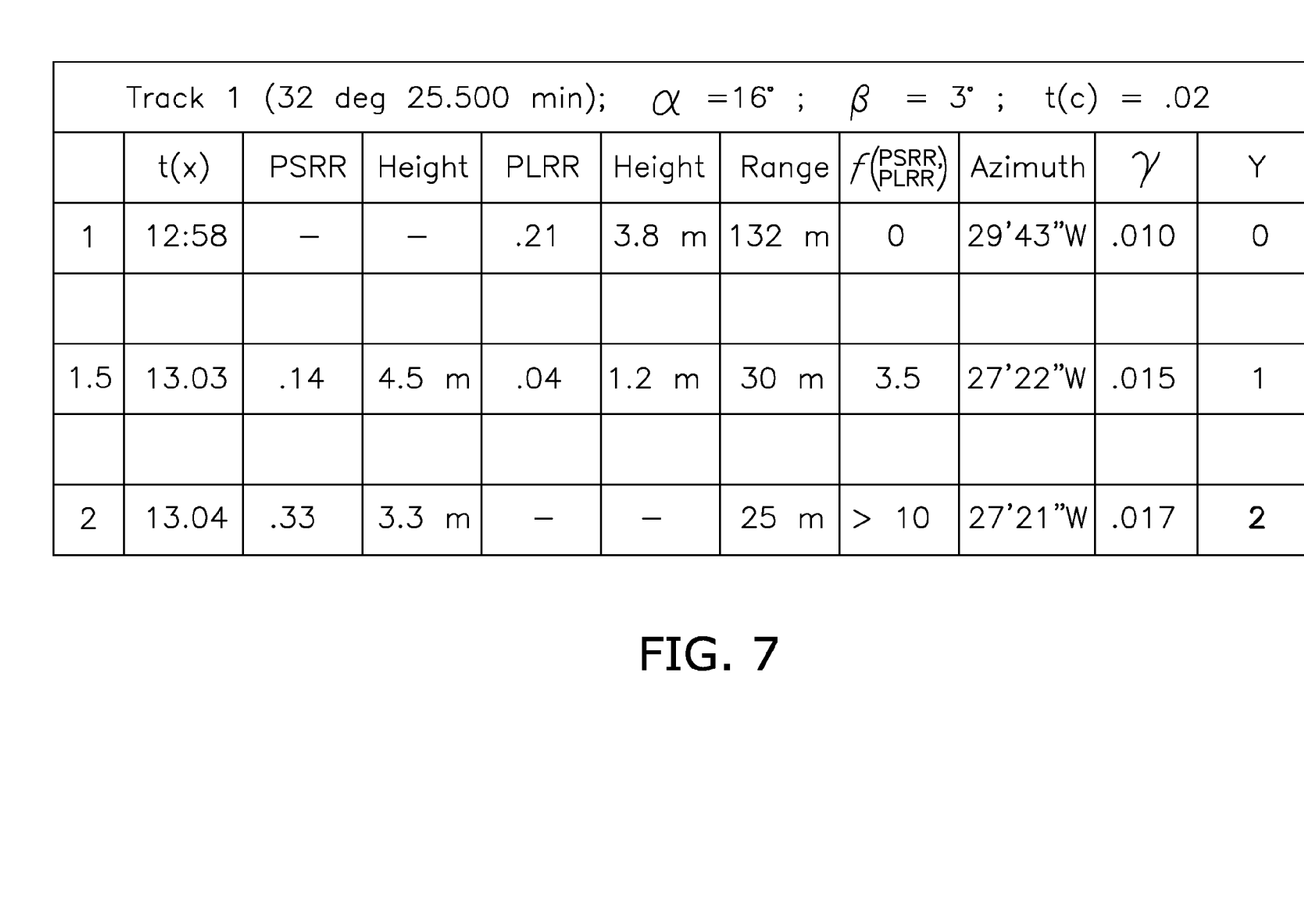
FIG. 7 is a chart representation of an exemplary track record stored by the memory storage device, in accordance with FIG. 2.

As illustrated in FIG. 3, where α is 16 degrees and β is 3 degrees, for example, a coverage height of 4.5 m for the SRR sensor beam 24 results at a distance of 30 m from the SRR sensor 16, while a coverage height of 1.2 m results for the LRR sensor beam 28 at the same distance; and at 150 m, the LRR sensor 18 produces a coverage height of 4.2 m. Thus, in the illustrated embodiment, a target located 0.45 m above ground will have a strong return signal for both sensors 16,18 but a target located 4 m above the ground will have a much larger relative return to the SRR sensor 16 than for the LRR sensor 18. In FIG. 7, such a hyper elevated object is modeled; at (2) the SRR sensor 16 shows a strong return signal ($P_{SRR}$) and the LRR sensor 18 fails to register a return signal ($P_{LRR}$).

With further respect to the sensors 16,18, it is appreciated that the operable range of the SRR sensor 16 must provide a maximum coverage length substantially greater than the minimum warning distance threshold necessary to provide a safe collision avoidance warning period. For example, based on vehicular braking capabilities and operator reaction times, where an SRR operable range of 30 m is presented, it is preferable to maintain speed limits that result in a warning distance threshold between 20 to 25 m.

The present invention functions to fuse information obtained from a plurality of single-dimensional radar sensors having differing beam angles of inclination and ranges to estimate the elevation of a target; and as such, may be used in conjunction with various types of radar sensors having a variety of bandwidths, resolutions, environmental applications, accuracies, power efficiencies, and sensitivities. Exemplary sensors suitable for use with the present invention include Tyco M/A-COM's 24 GHz Ultra Wide Band (UWB) short range radar (SRR), and Tyco M/A-COM's 77 GHz long range radar (LRR).

The DFP 22 is configured to manipulate the return signals data ($P_{SRR}$, $P_{LRR}$) to achieve a relative return signal value. With calibration a function of $P_{SRR}$ and $P_{LRR}$, range information of a particular target 20 can be used to determine whether the target 20 presents an "in-path" object. For example, a simple ratio between the signals (e.g., $P_{SRR}/P_{LRR}$), or a difference between the signals ($P_{SRR}-P_{LRR}$) may be utilized to calculate the relative value. Where this value exceeds a minimum threshold, that is to say, where the short range radar signal is substantially greater than the long range radar signal, the DFP 22 will generally determine based on $f(P_{SRR}, P_{LRR})$ that an overpass target has likely been detected. More detailed modes of operation are described below.

To enable absolute target tracking, the preferred system 10 also includes a locator device 30 configured to locate the current position coordinates, Cp (e.g., latitude, Longitude, and height), and preferably the heading of the host vehicle 12. As shown in FIGS. 3 and 4, the preferred locator device 30 includes a Global Positioning System (GPS) receiver 32 communicatively coupled to orbiting satellites, and a dead-reckoning system. Alternatively, the locator device 30 may utilize a network of cellular telephones, or a system using radio-frequency identification (RFID). The locator device 30 is communicatively coupled to the DFP 22 through the receiver 32, and is configured to determine and deliver to the DFP 22 the current position coordinates of the vehicle 12. The DFP 22, in turn, is configured to determine the absolute position of a target based on the detected range and azimuth of the target 20, and the Cp.

With further respect to tracking, the preferred system 10 also includes a memory storage device 34 that is communicatively coupled to the DFP 22, so as to receive data from and be queriable by the DFP 22 (FIG. 4). The storage device 34 is configured to retain a track record of a given target by creating a new record when an object is detected at position coordinates not previously entered, and by modifying an existing record when the position coordinates of a detected object generally match a previously entered target (FIG. 7). In FIG. 7, for example, subsequent entries for the track at (1.5) and (2) were recorded upon determination of generally matching (e.g., within a radius inclusive of the margin of error of the sensors 16,18, plus a factor of safety) position coordinates. It is appreciated that maintaining tracks of targets 20 enables the performance of time-dependant statistical analysis, wherein past data is analyzed to be able to make probabilistic decisions on new data. As further discussed herein, a trend analysis of the return signal strength may be performed, for example, to distinguish approaching from departing objects. Alternatively, the storage device 34 may be directly coupled to the sensors 16,18 where relative positioning tracks are maintained.

Figure 3A:
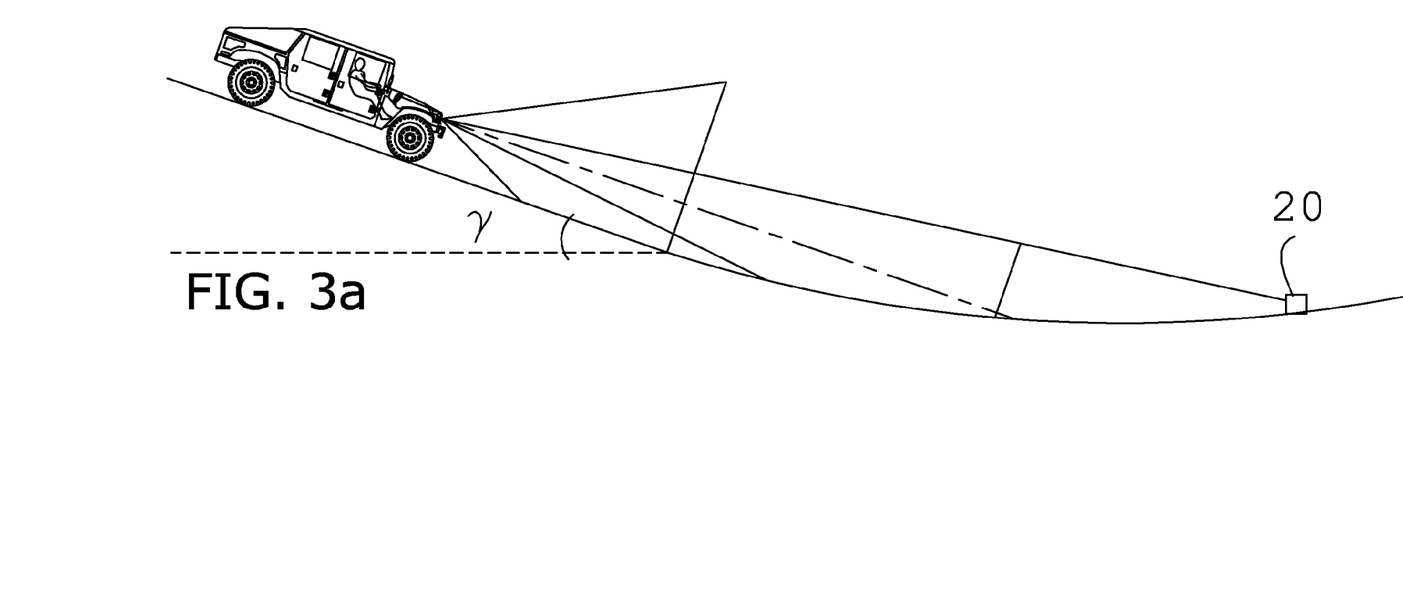
FIG. 3a is an elevation view of the host vehicle detecting a low-lying object on a vertically curved roadway, particularly illustrating an inaccurately shorter detection range and return signal.

Finally, an inclinometer 36 is also included in the preferred system 10 and communicatively coupled to the DFP 22 (FIG. 4). In this configuration, the DFP 22 is further configured to consider the absolute change in the angle of operation, γ, of the sensors 16,18, as is determinable by measuring the slope of the vehicle 12 (FIG. 3a). When the vehicle 12 is managing a significant vertical curvature (e.g., when the change in γ exceeds a minimum threshold), the preferred DFP 22 causes the fusion module to terminate or modify; as it is appreciated that in these instances, the fusion module may receive erroneous range data and produce inaccurate target elevation estimates. For example, in FIG. 3a the LRR sensor 18 is able to detect the low-lying object 20; however, due to the vertical curvature of the roadway the range is shorter than the actual intermediate travel distance, the return signal strength is likely to be greater than it would be on a comparable flat surface, and an extrapolation of the beam height at that distance will result in an inaccurate estimate of the target elevation.

B. Method of Operation

Once the sensors 16,18 are properly positioned and the system 10 calibrated, a preferred method of operation begins by receiving return signal data ($P_{SRR}$, $P_{LRR}$) from the sensors 16,18 and communicating the data to a data fusion module autonomously performed by the DFP 22. The fusion module is configured to determine at least one relative signal value based on the return signals ($P_{SRR}$, $P_{LRR}$) received by the sensors 16,18. The DFP 22 is further configured to estimate the elevation of the target 20 based on the relative signal value(s) determined. The relative value is compared to a plurality of pre-determined categories, preferably also stored in the DFP 22, to determine a matching object type. For example, where the signal strength ratio ($P_{SRR}/P_{LRR}$) is greater than 5, an "over-pass" object may be determined, and where the ratio is inclusively between 0.5 and 2, an "in-path" object may result.

Figure 5:
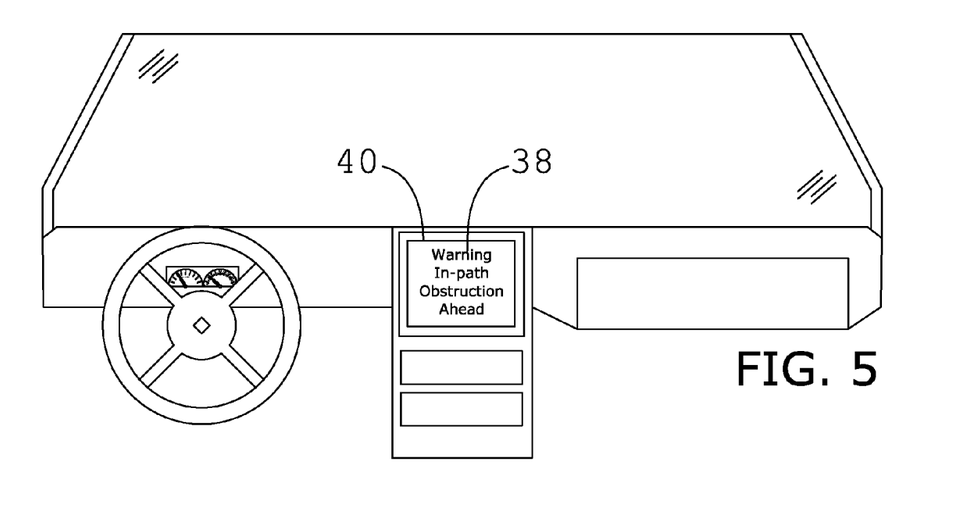
FIG. 5 is an elevation view of an in-vehicle dashboard including the monitor, particularly illustrating warning indicia on the monitor.

If the data fusion module determines a true in-path object, then the system 10 is further configured to execute a threat assessment module. When the threat assessment module is satisfied, a warning, such as the visible indicia 38 shown on the monitor 40 in FIG. 5 is caused to be generated, and/or a mitigating maneuver, such as the actuation of a braking module (not shown) is initiated. It is appreciated that the threat assessment module considers, among other things, the relative spacing between the host vehicle 12 and target 20, as well as the speed of the host vehicle 12.

Figure 6:
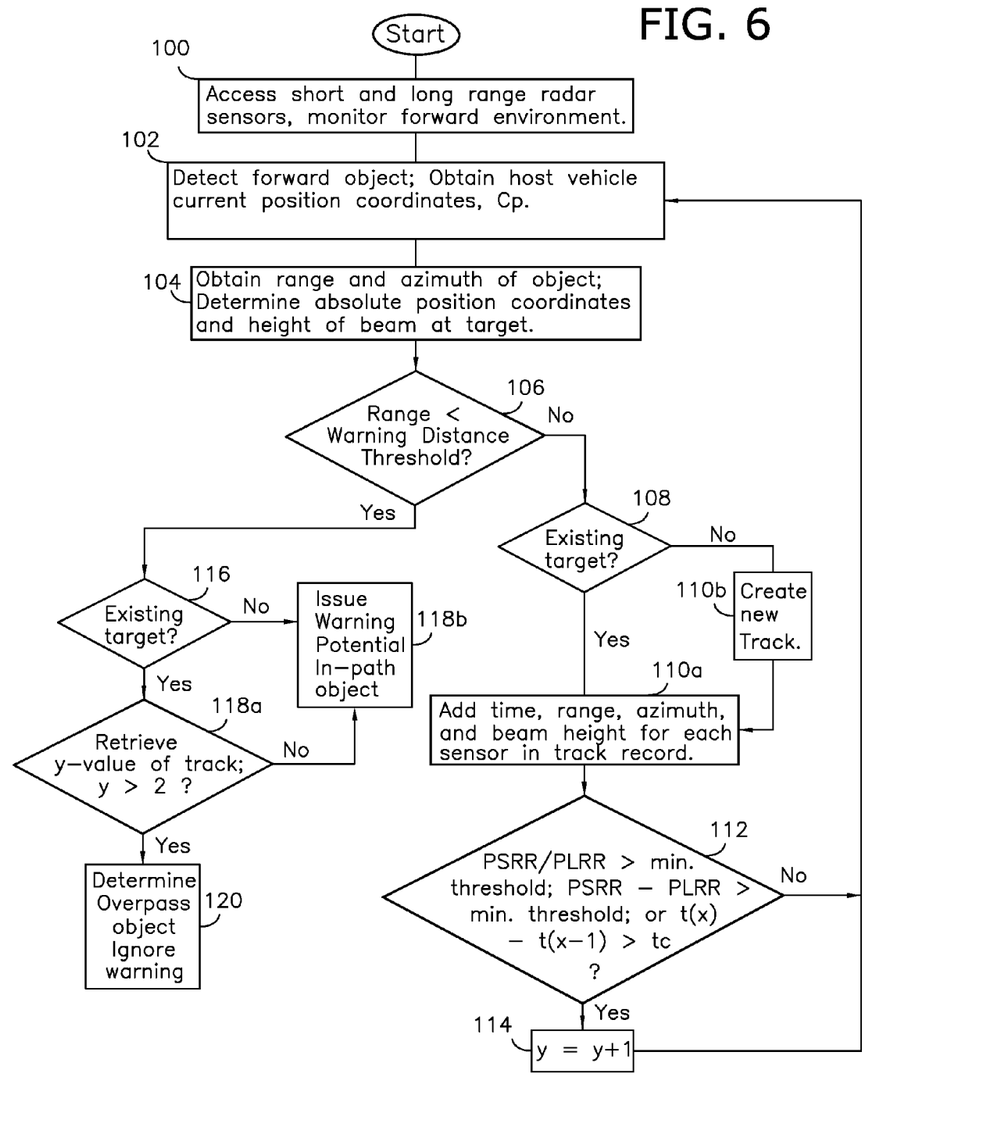
FIG. 6 is a flowchart of a method of operation in accordance with a preferred embodiment of the invention, wherein data from the first and second radar sensors are combined in a data fusion module, and a minimum count is considered prior to over-pass determination.
Figure 8:
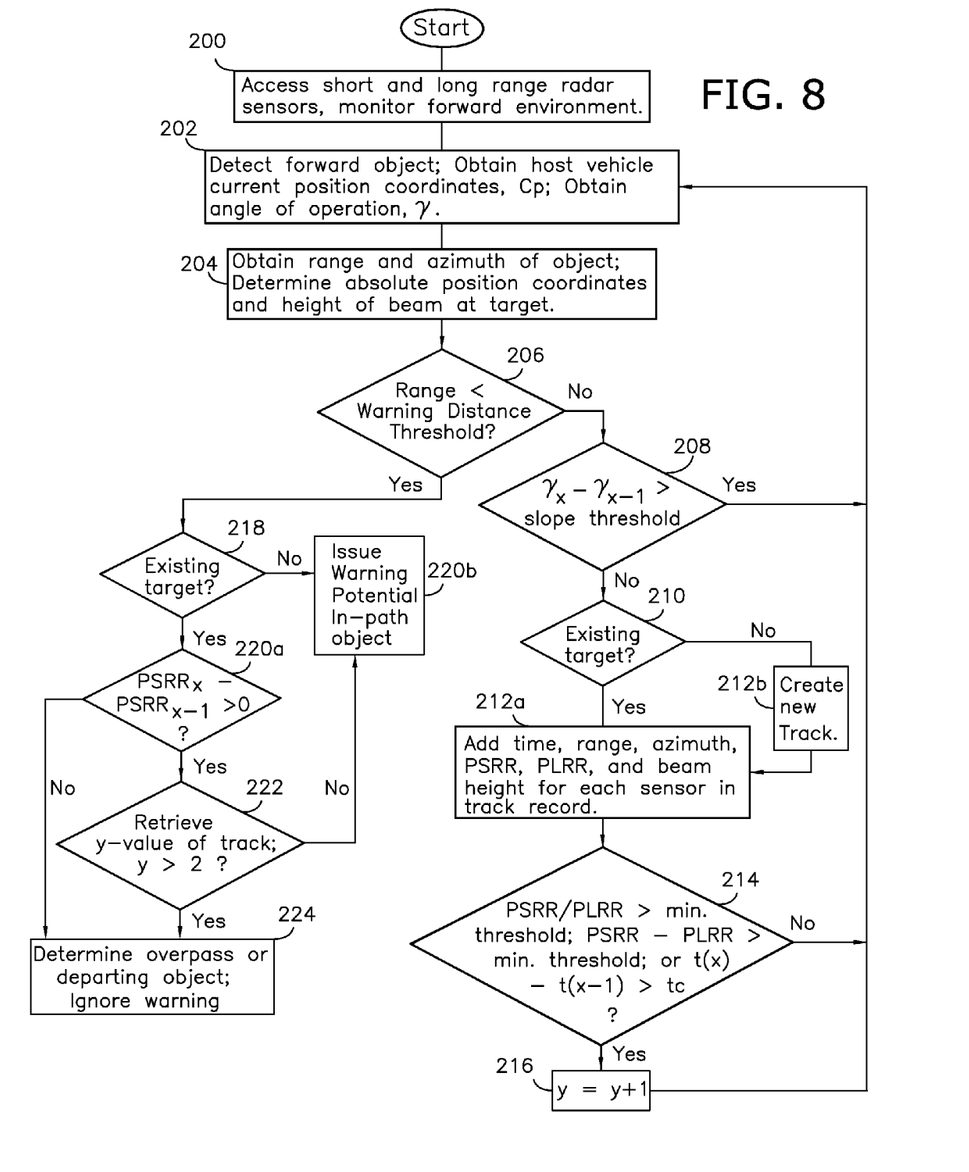
FIG. 8 is a flowchart of a second method of operation in accordance with a preferred embodiment of the invention, wherein trend analysis for the return signal strength and for the angle of sensory operation are also considered.

If a new object 20 is initially detected within the warning distance, the preferred system 10 is configured to issue a warning immediately, so that sufficient distance separates the vehicle 12 from the target 20 (FIGS. 6 and 8). It is appreciated that, in this situation, the object 20 may present a newly introduced, side approaching, slender or other condition, such as a remote vehicle traversing the host vehicle path, which was not subject to long range detection.

Once the target 20 is detected by the short or long range sensor 16,18, a sensor-detected range and relative object location are determined. The DFP 22 and locator device 30 are cooperatively configured to generally determine the absolute position coordinates of the sensors 16,18, by attributing the coordinate position of the receiver 32 to the sensors 16,18. More preferably, the length and width dimensions of the host vehicle 12 and the locations of the sensors 16,18 relative to the receiver 32 are pre-determined and considered so that the actual coordinate positions of the sensors 16,18 can be determined by the DFP 22. From the position coordinates of the sensors 16,18, the absolute position coordinates of the target 20 can be calculated by trigonometrically considering the azimuth and range or relative distance vector between the sensors 16,18 and target 20. As previously mentioned, determining the positioning of the target 20 is necessary to compile a track record, prepare trend analysis, and aggregate relative signal values derived for a particular target.

C. Method of Operation Including Counter

A more detailed method of operation is presented in FIG. 6, which utilizes a counter to determine a plurality of over-pass determinations prior to making a final decision. After the sensors 16,18 have been properly positioned and the system 10 calibrated at a step 100, the method begins once an object is detected by either sensor at a step 102. Also at step 102, the host vehicle position coordinates, Cp, at the instant of object detection are obtained. Next, at a step 104, the range and azimuth of the target 20 are determined based on the return signal data received; and the absolute position coordinates of the target 20 based on Cp, and the height of the angle of inclination at the object 20 is determined.

At a step 106, the threat assessment module determines whether the range is within an immediate warning distance. If not, the fusion module determines whether the target 20 is existing at step 108 by comparing its position coordinates to the existing tracks. If not an existing object, a new track record is created and a y-value associated with that track is set to "0" at step 110b; else the time of detection, range, azimuth and the height of the angle of inclination for each sensor 16,18 are caused to be stored in memory at step 110a. Next, at a step 112 a plurality of overpass predictive relationships are considered (FIG. 6). If at least one, and more preferably, two relationships are met, then at a step 114 the counter incrementally progresses and then returns to step 102; else, the method proceeds directly to step 102 without advancing the counter.

If the range is determined to be within the immediate warning distance at step 106, the fusion module determines whether the object is existing at step 116. If the target 20 is an existing object, then the y-value is retrieved for the track and compared to a minimum count (e.g., 2) at step 118a; else a warning is issued at step 118b. If the y-value is greater than the minimum count, then the target is deemed an overpass object and the warning is not issued at step 120. Alternatively, notice of an "over-pass object" may be generated at step 120 instead. Otherwise, the method proceeds to step 118b, where a warning of a potential "in-path object" is issued.

D. Method of Operation Including Trend Analysis

In FIG. 8, a second preferred method of operation is presented, wherein trends in return signal strength and the change in angle of operation are further considered in determining the threat assessment. Steps 200 through 206 of this method are similar to steps 100 through 106 of the method of part C, except that the instantaneous angles of operation, γ, measured by the inclinometer 36 during object detection is also obtained at step 202. Steps 210 through 216, likewise, match steps 108 through 114. At new step 208, a function of γ is compared to a maximum threshold to determine whether the vehicle is managing a significant vertical curve. If the change in γ indicates a vertical curve greater than a minimum threshold, then the reading is ignored as the method returns directly to step 202; otherwise the method proceeds to step 210.

At step 218, if the target within the warning distance is deemed to be an existing object, the method proceeds to step 220a, where the immediate trend in return signal strengths ($P_{SRR}$ and $P_{LRR}$) are considered to determine whether the target (regardless of whether in-path or overpass) is departing or approaching; else the method proceeds to step 220b, where the warning is issued. If deemed departing at step 220a (i.e., $P_{SSR}(t(x))-P_{SSR}(t(x-1))$ is negative), the method proceeds directly to step 224 where the warning is not issued. If the trend indicates an approaching object at 220a, the method proceeds to step 222, where the y-value is retrieved and compared to a minimum count to determine an overpass condition. Where the y-value is greater than the count an over-pass is deemed and the warning is not issued at step 224. Where the y-value is less than or equal to the count, however, the method returns to step 220b and a warning is issued.

The preferred forms of the invention described above are to be used as illustration only, and should not be utilized in a limiting sense in interpreting the scope of the present invention. Obvious modifications to the exemplary embodiments and methods of operation, as set forth herein, could be readily made by those skilled in the art without departing from the spirit of the present invention. The inventors hereby state their intent to rely on the Doctrine of Equivalents to determine and assess the reasonably fair scope of the present invention as pertains to any system or method not materially departing from but outside the literal scope of the invention as set forth in the following claims.

What is claimed is:

1. A system for estimating the elevation of at least one target utilizing single-dimensional scanning radar and data fusion, said system comprising:

a first single-dimensional radar sensor having a first operable range and first beam angle of inclination, and configured to generate a first return signal based on the relative distance between the first sensor and each of said at least one target, the operable range, and the angle of inclination;

a second single-dimensional radar sensor having a second operable range and a second beam angle of inclination, and configured to generate a second return signal based on the relative distance between the second sensor and each of said at least one target, the operable range, and the angle of inclination;

at least one inclinometer configured to measure first and second vertical angles of operation for the first and second sensors;

at least one digital fusion processor communicatively coupled to the first and second sensors, and said at least one inclinometer, and configured to determine a relative signal value based on the first and second return signals and the angles of operation; and a memory storage device further communicatively coupled to the processor, and operable to store data, said inclinometer, sensors and processor being cooperatively configured to sequentially determine a plurality of correlative angles of operation and relative return signal values for each target over a period, said processor being configured to deliver to and retrieve from the device the plurality of correlative angles of operation and relative return signal values, said processor being further configured to estimate the elevation of said each of said at least one target based on the correlative angles of operation and relative signal values.

2. The system as claimed in claim 1, wherein the digital fusion processor is configured to determine the relative signal value based on a simple ratio of the first return signal to the second return signal.

3. The system as claimed in claim 1, wherein the digital fusion processor is configured to determine the relative signal value based on the difference between the first and second return signals.

4. The system as claimed in claim 1, wherein a plurality of digital fusion processors inter-communicate and cooperatively configured to determine the relative signal value as a neural network.

5. The system as claimed in claim 1, wherein the digital fusion processor includes a Kalman filter and is configured to determine the relative signal value by applying the filter to the first and second return signals.

6. The system as claimed in claim 1, further comprising:
said sensors and processor being cooperatively configured to sequentially determine a plurality of relative return signal values for each of said at least one target over a period, so as to track each of said at least one target,
said processor being configured to deliver to and retrieve from the storage device the plurality of relative return signal values, and to estimate the elevation of said each of said at least one target based on an aggregate of the relative signal values.

7. The system as claimed in claim 6, further comprising:
a locator device configured to generally determine the current position coordinates of the sensors,
each of said sensors and processor being cooperatively configured to determine a target range between the sensor and target and generally determine the absolute position coordinates of the target based on the current position coordinates of the sensor and target range.

8. The system as claimed in claim 1, further comprising:
said sensor utilizing radar technology and being configured to detect the target over a period, so as to determine a plurality of return signal strengths from the detection of the target,
said processor being configured to determine a trend in the difference between successive strengths, wherein the preceding strength is subtracted from the succeeding strength, and to determine the relative signal value only when the trend is positive.

9. The system as claimed in claim 1, wherein the first and second operable ranges and the first and second beam angles of inclination are congruent, and the first and second vertical angles of operation are non-congruent.

10. The system as claimed in claim 1, wherein the processor is further configured to estimate the elevation of said target only when the rate of change in successive angles of operation do not exceed a pre-determined threshold.

* * * * *